(12) United States Patent
Sung et al.

(10) Patent No.: US 10,348,107 B2
(45) Date of Patent: Jul. 9, 2019

(54) BATTERY DEVICE

(71) Applicant: LG CHEM, LTD., Seoul (KR)

(72) Inventors: Chang-Hyun Sung, Daejeon (KR);
Young-Hwan Kim, Daejeon (KR);
Sang-Hoon Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 206 days.

(21) Appl. No.: 15/513,307

(22) PCT Filed: Feb. 24, 2016

(86) PCT No.: PCT/KR2016/001808
§ 371 (c)(1),
(2) Date: Mar. 22, 2017

(87) PCT Pub. No.: WO2016/137230
PCT Pub. Date: Sep. 1, 2016

(65) Prior Publication Data
US 2017/0317512 A1    Nov. 2, 2017

(30) Foreign Application Priority Data

Feb. 24, 2015    (KR) .................. 10-2015-0025865

(51) Int. Cl.
*H02J 7/00* (2006.01)
*B60L 58/10* (2019.01)
(52) U.S. Cl.
CPC ......... *H02J 7/0034* (2013.01); *B60L 58/10* (2019.02); *H02J 7/0031* (2013.01); *H02J 7/0068* (2013.01); *B60L 2270/20* (2013.01); *H02J 2007/004* (2013.01); *H02J 2007/0037* (2013.01); *Y02T 10/7005* (2013.01); *Y02T 10/705* (2013.01)

(58) Field of Classification Search
USPC ........................................ 320/134
See application file for complete search history.

(56) References Cited

U.S. PATENT DOCUMENTS

| 7,088,065 | B2 | 8/2006 | Ishikawa et al. |
| 7,884,587 | B2 | 2/2011 | Sugawara et al. |
| 2009/0058505 | A1* | 3/2009 | Yoshio ................ H01M 10/425 327/535 |
| 2010/0194346 | A1* | 8/2010 | Lee ....................... H02J 7/0031 320/134 |

FOREIGN PATENT DOCUMENTS

| EP | 2 629 392 A1 | 8/2013 |
| JP | 2004-129463 A | 4/2004 |

(Continued)

OTHER PUBLICATIONS

International Search Report issued in PCT/KR2016/001808 (PCT/ISA/210), dated Jun. 21, 2016.

*Primary Examiner* — Robert Grant
(74) *Attorney, Agent, or Firm* — Birch, Stewart, Kolasch & Birch, LLP

(57) ABSTRACT

The present disclosure discloses a battery device including a battery, a charging and discharging switch unit configured to control charging and discharging of the battery, a pre-charging unit configured to be charged during discharging of the battery, and a discharging unit configured to discharge the charge charged in the pre-charging unit.

8 Claims, 2 Drawing Sheets

(56) References Cited

FOREIGN PATENT DOCUMENTS

| | | |
|---|---|---|
| JP | 2004-248432 A | 9/2004 |
| JP | 2005-80491 A | 3/2005 |
| JP | 2009-60778 A | 3/2009 |
| JP | 2011-254650 A | 12/2011 |
| JP | 2014-45551 A | 3/2014 |
| KR | 10-2007-0016413 A | 2/2007 |
| KR | 10-2008-0018540 A | 2/2008 |
| KR | 10-2011-0094406 A | 8/2011 |
| WO | WO 2013/076877 A1 | 5/2013 |

* cited by examiner

BATTERY DEVICE

TECHNICAL FIELD

The present application claims priority to Korean Patent Application No. 10-2015-0025865 filed on Feb. 24, 2015 in the Republic of Korea, the disclosures of which are incorporated herein by reference.

The present disclosure relates to a battery device, and more particularly, to a battery device capable of preventing a load capacitor or a component included in the battery device from being damaged by inrush current.

BACKGROUND ART

Vehicles that use internal combustion engines that use gasoline or heavy oil as main fuel, have serious effects on pollution such as air pollution and the like. Therefore, recently, in order to reduce pollution, electric vehicles or hybrid vehicles that are powered by electrical energy being output from a battery device are being developed.

The battery device of the electrical or hybrid vehicle may include a battery where a plurality of battery cells are connected in series and/or in parallel to store and provide energy. Further, the battery device includes a peripheral circuit including a charging and discharging circuit. The peripheral circuit may be fabricated as a printed circuit board, and then electrically connected to a battery cell.

In such a battery device, when the battery is connected to an external power source, external power is supplied through the charging and discharging circuit, thereby charging the battery cell, and on the contrary when the battery is connected to a load, the power of the battery cell is supplied to the load through the charging and discharging circuit.

The charging and discharging circuit controls charging and discharging of the battery cell between the battery, and external power source and the load. The charging and discharging circuit may include a charging metal oxide silicon field effect transistor (MOSFET) switch and a discharging MOSFET switch on a line through which charging current or discharging current flows.

Meanwhile, loads such as electric products inside a vehicle that uses battery as power source, for example, electric control units (ECU), motors, power converters and the like, may apply high frequency current in conductive line connected to the battery. The high frequency current may strain the battery, and noise is generated in the conductive line where the high frequency current flows. In order to solve this, a load capacitor is mounted at a front end of the motor or electric converter, etc. The load capacitor is a means for preventing high frequency current from being emitted outside the load, thereby guaranteeing stable supply of power using the battery.

However, in the case where a load having the load capacitor at a power input end is directly connected to the battery, inrush current may momentarily flow towards the load. The momentarily generated inrush current may damage the charging and discharging switch and the load capacitor, deteriorating the lifespan of each device or causing false operation thereof.

DISCLOSURE

Technical Problem

The present disclosure provides a battery device capable of preventing a charging and discharging switch from being damaged by inrush current.

The present disclosure provides a battery device capable of reducing the speed of current inflow towards the load capacitor, thereby preventing the load capacitor from being damaged.

The present disclosure provides a battery device capable of interrupting the high frequency current flowing from outside towards the battery during charging.

Technical Solution

In one aspect of the present disclosure, there is provided a battery device including a battery; a charging and discharging switch unit configured to control charging and discharging of the battery; a pre-charging unit that is installed between the battery and the charging and discharging switch unit, and that is configured to be charged during discharging of the battery; and a discharging unit configured to discharge the charge charged in the pre-charging unit during turning off of the charging and discharging switch unit.

Preferably, the charging and discharging switch includes a first switch and a second switch provided between the battery and a load.

In one aspect, the battery device according to the present disclosure further includes a load capacitor connected in parallel to the load.

Preferably, the battery device according to the present disclosure further includes a driving unit configured to control the first switch and the second switch.

In another aspect, the driving unit includes a state detection unit configured to detect the state of the battery; a control unit configured to generate a control signal for driving the charging and discharging switch unit using detected data of the state detection unit; and a signal output unit configured to output the control signal to the charging and discharging switch unit.

Preferably, the driving unit compares the detected data of the state detection unit and reference data, and then controls the first switch and the second switch.

Preferably, the pre-charging unit includes at least one capacitor provided between the battery and the first switch.

The at least one capacitor is charged when the first switch and the second switch are turned on and the battery is discharged.

Preferably, the pre-charging unit is charged prior to the load capacitor, thereby adjusting the charging time of the load capacitor.

Preferably, the discharging unit includes a diode provided between the pre-charging unit and the driving unit.

Preferably, the diode discharges the charge charged in the pre-charging unit after the first switch and the second switch are turned off.

Advantageous Effects

A battery device according to the embodiments of the present disclosure may be provided with a pre-charging unit and a discharging unit between a battery and a charging and discharging switch unit. As the pre-charging unit is provided, when the discharging switch is turned on and the battery is discharged, charging of the load capacitor may be slowed down, thereby preventing the load capacitor and the charging and discharging switch unit from being damaged due to inrush current. Further, when the discharging switch is turned off, the discharging unit may discharge the charge charged in the pre-charging unit, thereby enabling the charging and discharging switch unit to be driven quickly. Further, even when high frequency current flows from outside towards the battery, the pre-charging unit filters the high frequency current, and thus the battery may be effectively prevented from being damaged by the high frequency current.

DESCRIPTION OF DRAWINGS

The accompanying drawings illustrate a preferred embodiment of the present disclosure and together with the detailed descriptions below, serve to provide further understanding of the technical spirit of the present disclosure, and thus, the present disclosure is not construed as being limited to the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Figure 1:
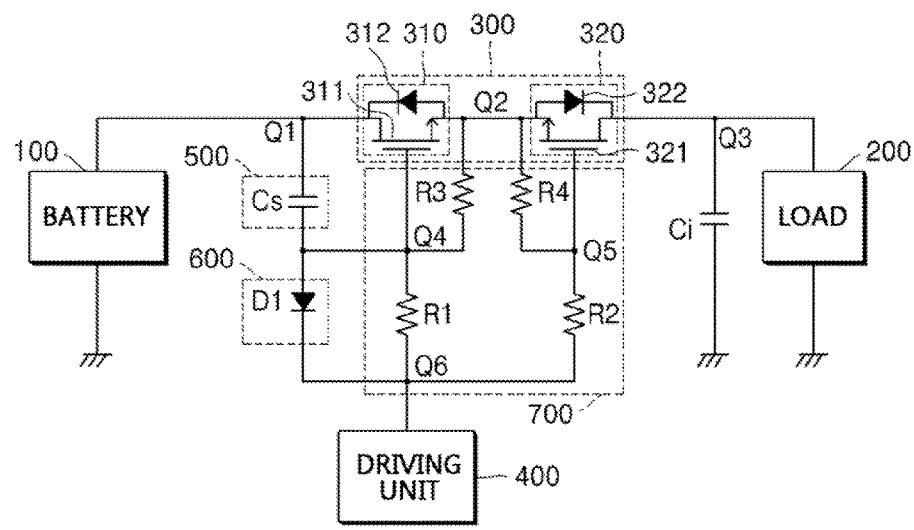
FIG. 1 is a view of a configuration of a battery device according to an embodiment of the present disclosure.

FIG. 1 is a view of a configuration of a battery device according to an embodiment of the present disclosure.

Referring to FIG. 1, the battery device according to an embodiment of the present disclosure may include a battery 100 configured to store and provide electrical energy, a load 200 configured to receive the electrical energy from the battery 100, a charging and discharging switch unit 300 provided between the battery 100 and the load 200 to control charging and discharging of the battery 100, a driving unit 400 configured to control driving of the charging and discharging switch unit 300, a pre-charging unit 500 configured to be pre-charged during discharging of the battery 100, and a discharging unit 600 configured to discharge the charge of the pre-charging unit 500.

Further, the battery device according to the embodiment of the present disclosure may selectively further include a load capacitor Ci connected in parallel to the load 200, and a protection unit 700 configured to protect the charging and discharging switch unit 300.

The battery 100 stores and provides electrical energy. Such a battery 100 may include a plurality of battery cells that are chargeable and dischargeable. Further, the battery 100 may include at least one battery module, and each battery module may include a plurality of battery cells. The plurality of battery modules may be connected in series and/or in parallel in various methods so that they correspond to the specification of the battery 100, load 200 or the like, and the plurality of battery cells may also be connected in series and/or in parallel.

Here, the type of the battery cell is not particularly limited, that is, examples of the battery cell include lithium ion battery, lithium polymer battery, nickel cadmium battery, nickel hydrogen battery, nickel zinc battery, etc.

The load 200 may include a charging unit for charging the battery 100, and an electric product that is driven by the electrical energy being provided from the battery 100.

The charging unit may include a charger and a connector for charging the battery 100. Further, examples of the electric product may include a motor inside the electric vehicle that may be powered by the electrical energy being provided from the battery 100, and a power converter such as an inverter that converts the electrical energy being provided from the battery 100. Further, the load 200 may include not only the electric vehicle but also various electric products such as a smart phone and the like, driven by the chargeable and dischargeable battery 100.

Meanwhile, a load capacitor Ci may be provided, connected in parallel to the load 200. The load capacitor Ci may be provided to prevent the switching current of high frequency from being emitted outside the load 200, thereby guaranteeing stable supply of power using the battery 100.

The charging and discharging switch unit 300 is provided on the current path between the battery 100 and the load 200, and controls charging and discharging of the battery 100. The charging and discharging switch unit 300 may include a first switch 310 and the second switch 320.

That is, the charging and discharging switch unit 300 may be provided between the battery 100 and the load 200, the first switch 310 provided at the battery 100 side, and the second switch 320 provided at the load 200 side. The first and second switch 310, 320 may be driven simultaneously during charging and discharging of the battery 100, or either one of them may be selectively driven.

The first switch 310 may include a first FET 311 and a first parasitic diode 312. The first FET 311 has a drain terminal and a source terminal provided on a current path of the battery 100, that is, between a first node Q1 and a second node Q2. Further, the first FET 311 has a gate terminal that is electrically connected to the driving unit 400. Here, the gate terminal of the first FET 311 may be connected with the driving unit 400 through a first resistance R1 of the protection unit 700. Therefore, the first FET 311 is driven according to a control signal being output from the driving unit 400 through the first resistance R1, and plays a role of applying current to the battery 100 during charging and applying discharging current of the battery 100 to the load 200 during discharging. The first parasitic diode 312 is connected in parallel to the first FET 311. That is, the first parasitic diode 312 is connected in a forward direction between the source terminal and the drain terminal of the first FET 311. The first parasitic diode 312 interrupts the path of the discharging current during charging and/or discharging of the battery 100 when the first FET 311 is turned on. Therefore, the first parasitic diode 312 may prevent the battery 100 from being charged and discharged simultaneously when the battery 100 is being charged, thereby improving safety of the battery 100.

The second switch 320 may include a second FET 321 and a second parasitic diode 322. The second FET 321 has a source terminal and a drain terminal provided on the current path of the battery 100, that is, between the second node Q2 and a third node Q3. Further, the second FET 321 has a gate terminal that is electrically connected with the driving unit 400. Here, the gate terminal of the second FET 321 may be connected with the driving unit 400 through a second resistance R2 of the protection unit 700. Therefore, the second FET 321 is driven according to a control signal being output from the driving unit 400 through the second resistance R2, and plays a role of applying current to the battery 100 during charging and applying discharging current of the battery 100 to the load 200 during discharging. The second parasitic diode 322 is connected in parallel to the second FET 321. That is, the second parasitic diode 322 is connected in a forward direction between the source terminal and the drain terminal of the second FET 321. The second parasitic diode 322 interrupts the path of the charging current during charging and/or discharging of the battery 100. Therefore, the second parasitic diode 322 may prevent the battery 100 from being charged and discharged simultaneously when the battery 100 is being discharged, thereby improving safety of the battery 100.

The driving unit 400 outputs a control signal for driving the charging and discharging switch unit 300. That is, the driving unit 400 is connected to the gate terminal of the first FET 311 and the gate terminal of the second FET 321, and drives each of the first and second FET 311, 321. During charging and discharging of the battery 100, the driving unit 400 may turn on each of the first and second FET 311, 321, and in other cases, turn each of them off. Here, the control signal that turns on the first and second FET 311, 321 may be a logic high signal, and the control signal that turns off the first and second FET 311, 321 may be a logic low signal. Meanwhile, the driving unit 400 may be provided inside a battery management system (BMS).

The pre-charging unit 500 may be provided between the battery 100 and the first switch 310. Such a pre-charging unit 500 may include at least one capacitor Cs connected between the gate terminal and the drain terminal of the first FET 311. That is, the at least one capacitor Cs is provided between the first node Q1 and a fourth node Q4. Here, in the case where a plurality of capacitors Cs are provided, they may be connected in parallel between the first node Q1 and a fourth node Q4. The pre-charging unit 500 that includes such the at least one capacitor Cs may control the slope by which the voltage of the load capacitor Ci increases when the first and second switch 310, 320 are turned on, preventing the phenomenon of inrush current flowing towards the load capacitor Ci. That is, when the first and second switch 310, 320 are turned on to discharge the battery 100, the load capacitor Ci is charged after the pre-charging unit 500 including the capacitor Cs is charged, so that the load capacitor Ci is not charged rapidly, thereby preventing the inrush current from flowing towards the load capacitor Ci. Therefore, it is possible to prevent the charging and discharging switch unit 300 from being damaged by the inrush current, and it is possible to increase the lifespan of the load capacitor Ci. Here, the pre-charging unit 500 may adjust the slope by which the voltage of the load capacitor Ci increases according to the capacitance of the capacitor Cs or the number of the capacitors Cs. That is, the greater the capacitance of the capacitor Cs, the longer the load capacitor Ci may be charged, and the greater the number of the capacitors Cs, the longer the load capacitor Ci may be charged.

A discharging unit 600 is provided to discharge the charge charged in the pre-charging unit 500. The discharging unit 600 may include a diode D1. Such a discharging unit 600 may be provided between the pre-charging unit 500 and the driving unit 400. That is, the diode D1 may be provided between the fourth node Q4 and a sixth node Q6. When turning off the first and second switch 310, 320, the discharging unit 600 discharges the charge charged in the pre-charging unit 500, that is, in the capacitor Cs, thereby enabling the first and second switch 310, 320 to be turned off quickly.

Meanwhile, a protection unit 700 for protecting the charging and discharging switch unit 300 may be further provided. The protection unit 700 may include a plurality of resistances R1 to R4. The first resistance R1 is connected between the gate terminal of the first FET 311 and the driving unit 400, that is, between the fourth node Q4 and the sixth node Q6, and the second resistance R2 is connected between the gate terminal of the second FET 321 and the driving unit 400, that is, between the fifth node Q5 and the sixth node Q6. Further, the third resistance R3 is connected between the source terminal and the gate terminal of the first FET 311, that is, between the second node Q2 and the fourth node Q4, and the fourth resistance R4 is connected between the source terminal and the gate terminal of the second FET 321, that is, between the second node Q2 and the fifth node Q5. Here, the first and second resistance R1 and R2 play a role of absorbing the impulse component of the signal being output from the driving unit 400, thereby protecting each of the first and second FET 311, 321. Further, the third and fourth resistance R3 and R4 each forms a negative voltage difference between the gate terminal and the source terminal of the first and second FET 311, 321, playing a role of adjusting the initial current amount flowing between the source terminal and the drain terminal.

A method for driving a battery device according to the aforementioned embodiment of the present disclosure is explained hereinafter.

During charging of the battery 100, the battery 100 is connected with a power supply apparatus (not illustrated) using a connector instead of the load 200, and the driving unit 400 outputs a control signal of a logic high level to the first and second switch 310, 320 of the charging and discharging switch unit 300. Accordingly, the first FET 311 of the first switch 310 and the second FET 321 of the second switch 320 are turned on. Therefore, power is applied from the charger to the battery 100, thereby charging the battery 100. Here, the first parasitic diode 312 of the first switch 310 interrupts the path of the discharging current of the battery 100.

Further, when discharging the battery 100 in order to supply electrical energy to the load 200, the driving unit 400 outputs a control signal of a logic high level to the first and second switch 310, 320 of the charging and discharging switch unit 300. Accordingly, the first and second FET 311, 321 are each turned on. Therefore, the electrical energy is provided from the battery 100 to the load 200, wherein the load capacitor Ci is charged after at least one capacitor Cs of the pre-charging unit 500 is charged. That is, the capacitor Cs is charged before the power of the battery 100 charges the load capacitor Ci. Therefore, it is possible to adjust the speed the voltage of the load capacitor Ci increases, that is, the charging speed. Accordingly, it is possible to prevent the charging and discharging switch unit 300 from being damaged by the inrush current that may be caused by the rapid charging of the load capacitor Ci. Meanwhile, when discharging the battery 100, the second parasitic diode 322 of the second switch 320 interrupts the path of the charging current of the battery 100.

When the supplying of power to the load 200 is completed, the driving unit 400 outputs a control signal of a logic low level to the first and second switch 310, 320, thereby turning off the first and second FET 311, 321. Here, the discharging unit 600 may discharge the charge charged in the pre-charging unit 500. That is, since the discharging unit 600 including the diode D1 is provided between the pre-charging unit 500 and the driving unit 400, and the driving unit 400 outputs a signal of a logic low level in order to turn off the first and second FET 311, 321, the discharging unit 600 discharges the charge charged in the pre-charging unit 500 through the driving unit 400. Therefore, the turning off of the first and second switch 310, 320 may be performed quickly. Further, as the first and second FET 311, 321 are turned off, the charge charged in the load capacitor Ci are further discharged.

Figure 2:
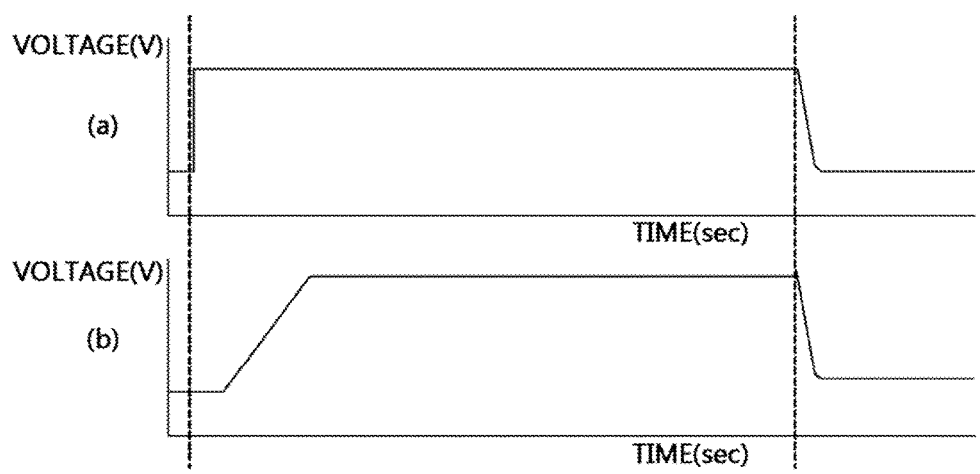
FIG. 2 is a graph of mutual comparison of voltage changes of a load capacitor when supplying discharging current to a load using a conventional battery device and a battery device according to an embodiment of the present disclosure.

FIG. 2 is a view illustrating voltage changes of the load capacitor during discharging of a conventional battery device and a battery device according to an embodiment of the present disclosure.

The battery device according to the present disclosure includes a pre-charging unit and a discharging unit. As illustrated in FIG. 2(a), in the conventional battery device, the load capacitor is rapidly charged by the inrush current during discharging of the battery. However, as illustrated in FIG. 2(b), it can be seen that in the battery device according to the present disclosure, the load capacitor is charged slowly by limited current. That is, in the battery device according to the present disclosure, as the pre-charging unit is provided, during discharging of the battery, the load capacitor is charged after the pre-charging unit is charged first, and thus the load capacitor may be charged slowly than in the conventional battery device. Meanwhile, when turning off the charging and discharging switch unit, there is no big difference in the speed of discharging the load capacitor between the conventional battery device and the battery device according to the present disclosure.

Figure 3:
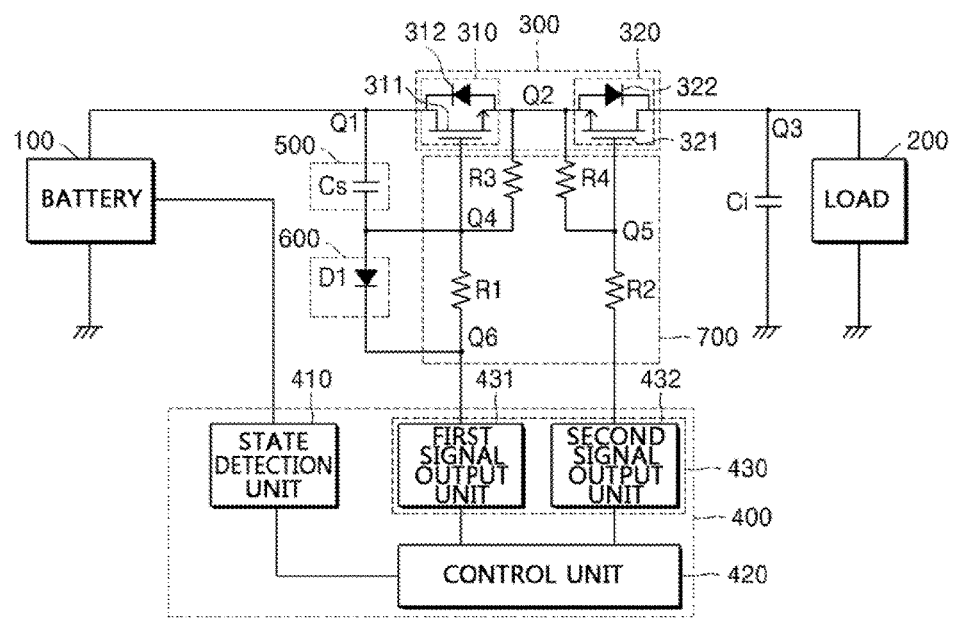
FIG. 3 is a view of a configuration of a battery device according to another embodiment of the present disclosure.

FIG. 3 is a view of a configuration of a battery device according to another embodiment of the present disclosure.

Referring to FIG. 3, the battery device according to the another embodiment of the present disclosure may include a battery 100 configured to store and provide electrical energy, a load 200 configured to receive the electrical energy from the battery 100, a charging and discharging switch unit 300 provided between the battery 100 and the load 200 to control the charging and discharging of the battery 100, a driving unit 400 configured to control driving of the charging and discharging switch unit 300, and that includes a state detection unit 410, a control unit 420 and a signal output unit 430, a pre-charging unit 500 configured to be pre-charged during discharging of the battery 100, a discharging unit 600 configured to discharge the charge of the pre-charging unit 500, selectively a load capacitor Ci connected in parallel to the load 200, and a protection unit 700 configured to protect the charging and discharging switch unit 300.

This another embodiment of the present disclosure is different from the aforementioned embodiment in that the driving unit 400 includes the state detection unit 410, the control unit 420 and the signal output unit 430. The driving unit 400 that includes the state detection unit 410, the control unit 420 and the signal output unit 430 may be provided inside the battery management system that manages the state of the battery.

The state detection unit 410 is provided in at least one area of the battery 100, and detects the state of the battery 100. For example, the state detection unit 410 measures the voltage, temperature, current and the like of the battery 100. Such a state detection unit 410 may include a voltage measurement unit (not illustrated) configured to measure the voltage of the battery and a temperature measurement unit (not illustrated) configured to measure the temperature of the battery. Further, the state detection unit 410 may further include a current measurement unit (not illustrated) configured to measure the current of the battery. The voltage measurement unit may be connected to, for example, one terminal and another terminal of the battery 100, that is, to a positive electrode terminal and a negative electrode terminal, and measure the voltage of the battery 100, wherein the voltage measurement unit may measure the voltage of the battery 100 by measuring the voltage difference between the positive electrode terminal and the negative electrode terminal of the battery 100. Further, the temperature measurement unit may be provided in at least one area of the battery 100, and measure the temperature of the at least one area of the battery 100. For example, the temperature measurement unit may be connected to each of the plurality of battery modules, and measure the temperature of each battery module, and may be provided in a plurality of areas of the battery 100, and measure the temperature of each area.

The voltage measurement unit may include a well-known voltage measurement circuit, the temperature measurement unit may include a thermocouple, and the current measurement unit may include a current measurement device such as a hall sensor. However, the present disclosure is not limited to the aforementioned.

The control unit 420 is connected to the state detection unit 410, and receives input of state data of the battery 100 from the state detection unit 410. Further, the control unit 420 generates a control signal according to the state data of the battery 100, and supplies the generated control signal to the signal output unit 430. That is, the control unit 420 generates the control signal for controlling the charging and discharging switch unit 300 using the data such as the voltage, temperature, current and the like of the battery 100, detected by the state detection unit 410. Meanwhile, the control unit 420 may refer to data stored in a storage (not illustrated) such as a memory device, in order to generate the control signal according to the state of the battery 100. For example, the storage is provided with a look-up table that stores the voltage and temperature of the battery 100, and the charging and discharging amount of the battery 100 according thereto, and the control unit 420 matches the data such as the voltage and temperature input from the state detection unit 410 to the data of the charging and discharging amount of the battery 100 stored in the look-up table, and generates the charging and discharging control signal according to the charging and discharging amount of the battery 100 according to the matching. That is, the control unit 420 compares the detected data of the state detection unit 410 with the reference data of the storage, and if the battery 100 is in an overcharged state, the control unit 420 generates a control signal for turning off the first and second switch 310, 320, and if the battery 100 is charged insufficiently, the control unit 420 generates a control signal for turning on the first and second switch 310, 320 in a charge mode. By controlling charging and discharging of the battery 100 according to the state of the battery 100 as aforementioned, it is possible to manage the battery 100 under optimal conditions. For example, by controlling charging and discharging of the battery 100 according to the state of the battery 100 such as over-discharged, fully-discharged, fully-charged and over-charged state and the like, it is possible to manage the battery 100 under optimal conditions.

The signal output unit 430 may include a first signal output unit 431 configured to output a control signal to the first switch 310, and a second signal output unit 432 configured to output a control signal to the second switch 320. The first signal output unit 431 may be connected to the gate terminal of the first FET 311 through the first resistance R1, and control turning on and turning off of the first FET 311 according to the control signal of the control unit 420. That is, the first signal output unit 421 turns on or turns off the first FET 311 according to the control signal being output according to the over-discharged, fully-discharged, fully-charged or over-charged state of the battery 100. Further, the second signal output unit 432 may be connected to the gate terminal of the second FET 321 through the second resistance R2, and control turning on and turning off of the second FET 321 according to the control signal of the control unit 420. That is, the second signal output unit 432 turns on or turns off the second FET 321 according to the control signal being output according to the over-discharged, fully-discharged, fully-charged or over-charged state of the battery 100.

Meanwhile, the present disclosure has been described in detail. However, it should be understood that the detailed description and specific examples, while indicating preferred embodiments of the disclosure, are given by way of illustration only. Further, various changes and modifications within the scope of the disclosure will become apparent to those skilled in the art from this detailed description.

INDUSTRIAL APPLICABILITY

The battery device according to the embodiments of the present disclosure may have a pre-charging unit and a discharging unit between a battery and a charging and discharging switch unit. Since the pre-charging unit is provided, when the discharging switch is turned on to discharge the battery, the load capacitor may be charged slowly, and thus preventing the load capacitor and the charging and discharging switch unit from being damaged by inrush current. Further, the discharging unit may discharge the charge charged in the pre-charging unit when the discharging switch is being turned off, thereby enabling the charging and discharging switch unit to be driven quickly. Further, even when high frequency current flows from outside towards the battery, the pre-charging unit filters the high frequency current, thereby effectively preventing the battery from being damaged by the high frequency current.

What is claimed is:

1. A battery device comprising:
   a battery;
   a charging and discharging switch unit configured to control charging and discharging of the battery, wherein the charging and discharging switch unit comprises a first switch and a second switch provided between the battery and a load;
   a pre-charging unit that is installed between the battery and the charging and discharging switch unit, and that is configured to be charged during discharging of the battery;
   a discharging unit configured to discharge the charge charged in the pre-charging unit during turning off of the charging and discharging switch unit; and
   a driving unit configured to control the first switch and the second switch,
   wherein the discharging unit comprises a diode provided between the pre-charging unit and the driving unit.

2. The battery device of claim 1, further comprising a load capacitor connected in parallel to the load.

3. The battery device of claim 1, wherein the driving unit comprises:
   a state detection unit configured to detect the state of the battery;
   a control unit configured to generate a control signal for driving the charging and discharging switch unit using detected data of the state detection unit; and
   a signal output unit configured to output the control signal to the charging and discharging switch unit.

4. The battery device of claim 3, wherein the driving unit compares the detected data of the state detection unit with a reference data, and controls the first switch and the second switch.

5. The battery device of claim 2, wherein the pre-charging unit comprises at least one capacitor provided between the battery and the first switch.

6. The battery device of claim 5, wherein the at least one capacitor is charged when the first switch and the second switch are turned on and the battery is discharged.

7. The battery device of claim 6, wherein the pre-charging unit is charged prior to the load capacitor, adjusting the charging time of the load capacitor.

8. The battery device of claim 1, wherein the diode discharges the charge charged in the pre-charging unit after the first switch and the second switch are turned off.

* * * * *